US008078786B2

(12) United States Patent
Hong et al.

(10) Patent No.: US 8,078,786 B2
(45) Date of Patent: Dec. 13, 2011

(54) METHOD AND SYSTEM FOR REQUEST ACCESSING AND SCHEDULING

(75) Inventors: Wei-Hsiang Hong, Taipei (TW); Yao-Chun Su, Taipei (TW); Peter Chia, Taipei (TW); Chih-Kuo Kao, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 753 days.

(21) Appl. No.: 11/836,896

(22) Filed: Aug. 10, 2007

(65) Prior Publication Data

US 2008/0049758 A1 Feb. 28, 2008

(30) Foreign Application Priority Data

Aug. 25, 2006 (TW) ............................... 95131456 A
Apr. 27, 2007 (TW) ............................... 96115199 A

(51) Int. Cl.
 *G06F 13/36* (2006.01)
(52) U.S. Cl. .......................... 710/310; 710/52
(58) Field of Classification Search .......... 710/306–317, 710/52–57, 36–40, 110, 112
 See application file for complete search history.

(56) References Cited

U.S. PATENT DOCUMENTS

| | | | | |
|---|---|---|---|---|
| 4,627,018 A * | 12/1986 | Trost et al. ..................... | 711/149 |
| 5,023,370 A * | 6/1991 | Benefice-Malouet et al. .............................. | 562/125 |
| 5,809,278 A * | 9/1998 | Watanabe et al. .............. | 711/150 |
| 5,819,112 A * | 10/1998 | Kusters ........................... | 710/36 |
| 6,006,303 A * | 12/1999 | Barnaby et al. ............... | 710/244 |
| 6,173,378 B1 * | 1/2001 | Rozario et al. ................ | 711/163 |
| 6,212,590 B1 * | 4/2001 | Melo et al. ..................... | 710/119 |
| 6,480,917 B1 * | 11/2002 | Moertl et al. .................. | 710/119 |
| 6,513,089 B1 * | 1/2003 | Hofmann et al. .............. | 710/309 |
| 6,728,790 B2 * | 4/2004 | Ennis ................................. | 710/5 |
| 6,832,279 B1 * | 12/2004 | Potter et al. .................... | 710/112 |
| 7,251,704 B2 | 7/2007 | Solomon et al. | |
| 7,263,566 B2 * | 8/2007 | Ganasan et al. .............. | 710/118 |
| 7,478,189 B2 * | 1/2009 | Reed .............................. | 710/310 |
| 7,525,986 B2 * | 4/2009 | Lee et al. ....................... | 370/462 |
| 7,657,681 B2 * | 2/2010 | Tanaka .......................... | 710/240 |
| 2007/0220193 A1 * | 9/2007 | Ikeda et al. ................... | 710/309 |
| 2008/0288689 A1 * | 11/2008 | Hoang et al. .................. | 710/113 |

FOREIGN PATENT DOCUMENTS

TW 200415890 8/2004

OTHER PUBLICATIONS

Taiwanese language office action dated Jul. 14, 2010.
English language translation of abstract of TW 200415890 (published Aug. 16, 2004).

* cited by examiner

*Primary Examiner* — Raymond N Phan
(74) *Attorney, Agent, or Firm* — Thomas|Kayden

(57) ABSTRACT

A request scheduling method is provided in a request accessing system having a processing unit, an upstream unit coupled to the processing unit, a downstream unit coupled to the processing unit and the upstream unit, and at least one endpoint device coupled to the upstream unit and the downstream unit, wherein the endpoint device asserts at least one request to the upstream unit. The request scheduling method includes: transmitting the request to a processing unit while the request is a non-peer-to-peer request, and transmitting the request to a downstream unit while the request is a peer-to-peer request; wherein if the request is a peer-to-peer and posted request and there is a previous asserted request which is peer-to-peer and non-posted request and the previous asserted request has a latency exceeds a predetermined time, transmitting the request earlier than the previous asserted request to the downstream unit.

18 Claims, 4 Drawing Sheets

METHOD AND SYSTEM FOR REQUEST ACCESSING AND SCHEDULING

This application claims the benefits of Taiwan application Serial No. 95131456, filed Aug. 25, 2006, and Taiwan application Serial No. 96115199, filed Apr. 27, 2007, the subject matter of which is incorporated herein by reference.

BACKGROUND OF THE INVENTION

1. Field of the Invention

The invention relates in general to a request accessing method and a system thereof; and more particularly to a request scheduling method in a PCI-EXPRESS system.

2. Description of the Related Art

With the continuously enhanced performances of the processor and the system, peripheral components interconnect express (PCI Express) is a high performance, general purpose I/O interconnect defined for a wide variety of future computing and communication platforms. In the computer system, a root complex, such as a chipset, is coupled between the endpoint devices and a central processing unit (CPU) through a PCIE bus and PCIE interface. The root complex denotes the root of an I/O hierarchy of the CPU and the connected endpoint devices.

SUMMARY OF THE INVENTION

A request accessing method for accessing at least one request is provided in the present invention which includes: storing the request to a posted request buffer while the request is a posted-request; storing the request to a non-posted request buffer while the request is a non-posted request; arbitrating the priorities of the requests in the posted buffer and the non-posted buffer; and scheduling the requests according to one schedule rules.

A request accessing system is also provided in the present invention which includes: an endpoint device for asserting at least one request, wherein the request is stored to a first posted request buffer while the request is a posted request, or stored to a first non-posted request buffer while the request is a non-posted request; a root complex, coupled to the endpoint device, for receiving the request; and a processing unit, coupled to the root complex for processing the request.

One request scheduling method is provided in the present invention which includes: receiving a peer-to-peer and posted request; and increasing the priority of the peer-to-peer and posted request over the priority of a previous asserted peer-to-peer and non-posted request which latency exceeds a predetermined time.

Another request scheduling method is also provided to be applied in a request accessing system having a processing unit, an upstream unit coupled to the processing unit, a downstream unit coupled to the processing unit and the upstream unit, and at least one endpoint device coupled to the upstream unit and the downstream unit, wherein the endpoint device asserts at least one request to the upstream unit. The request scheduling method includes: transmitting the request to a processing unit while the request is a non-peer-to-peer request, and transmitting the request to a downstream unit while the request is a peer-to-peer request; wherein if the request is a peer-to-peer and posted request and there is a previous asserted request which is peer-to-peer and non-posted request and the previous asserted request has a latency exceeds a predetermined time, transmitting the request earlier than the previous asserted request to the downstream unit.

The invention will become apparent from the following detailed description of the preferred but non-limiting embodiments. The following description is made with reference to the accompanying drawings.

DETAILED DESCRIPTION OF THE INVENTION

Figure 1:
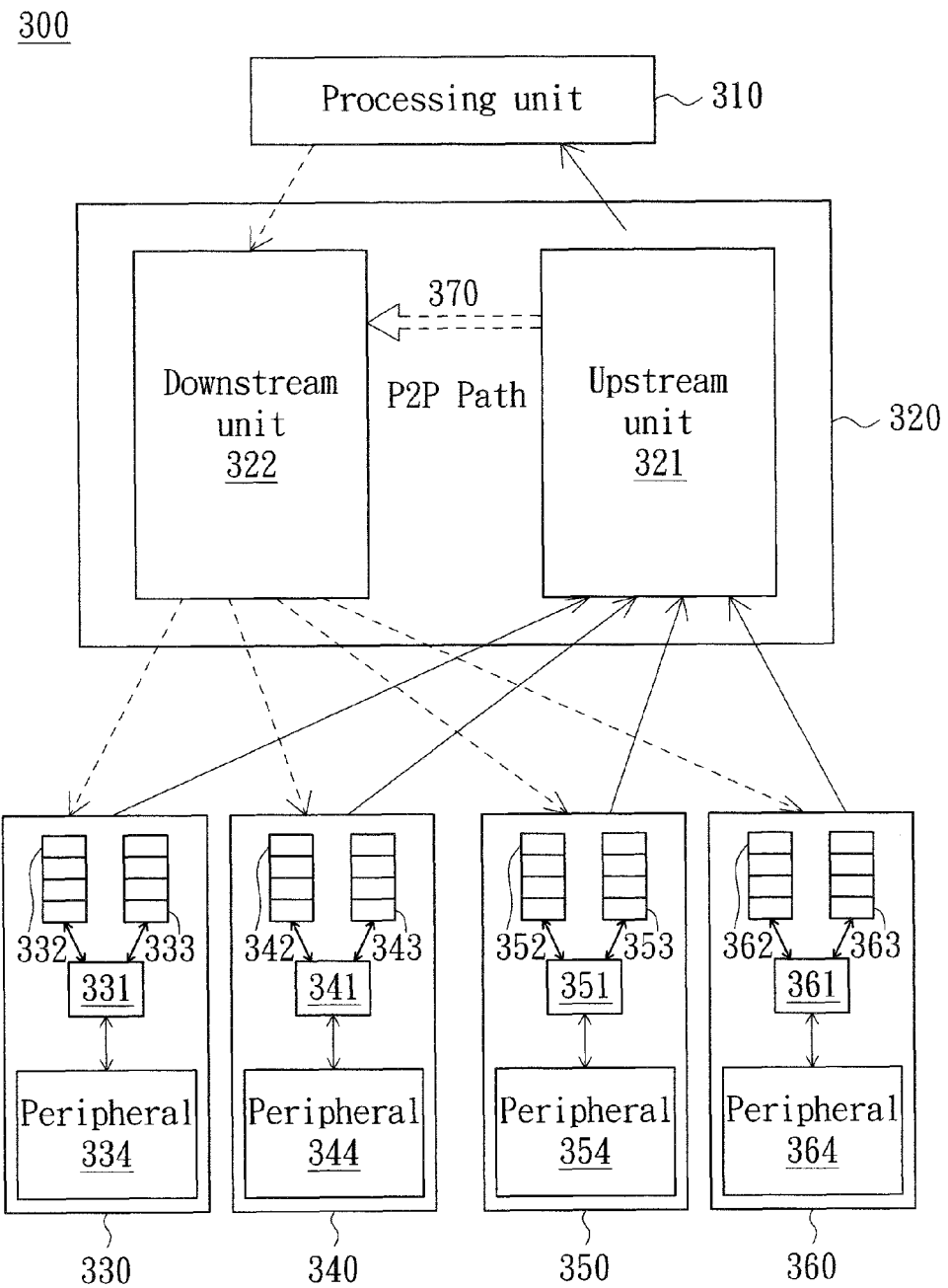
FIG. 1 is a block diagram showing a request accessing system according to one embodiment of the invention.

The request accessing method and system of the invention will be described with reference to FIG. 1. FIG. 1 shows a request access system 300 according to the invention. The request access system 300 includes a processing unit 310, a root complex 320 couples to the processing unit 310, and at least one endpoint devices coupled to the root complex 320. In this embodiment, assume four endpoint devices 330, 340, 350 and 360 are provided. Each endpoint devices 330~360 has a peripheral 334, 344, 354 and 364 respectively for asserting at least one requests; and an onboard address decoding units 331, 341, 351 and 361 respectively for decoding the requests to determine the types of the request. The request could be distinguished into: a peer-to-peer and posted request, a peer-to-peer and non-posted request, a non-peer-to-peer and posted request and a non-peer-to-peer and non-posted request. Each endpoint devices 330~360 further includes a posted request buffer 332, 342, 352 and 362 respectively for storing posted requests (i.e. could be a peer-to-peer and posted request and a non-peer-to-peer and posted request); and a non-posted buffer 333, 343, 353 and 363 respectively for storing non-posted requests (i.e. could be a peer-to-peer and non-posted request and a non-peer-to-peer and non-posted request). Root complex 320 handles the requests asserted from the endpoint devices 330~360 which includes an upstream unit 321 and a downstream unit 322. The upstream unit 321 receives the request from the endpoint devices 330~360 and transmits the request to the processing unit 310 while the request is a non-peer-to-peer request; or transmits to the downstream unit 322 while the request is a peer-to-peer request through a peer-to-peer path 370.

Figure 2:
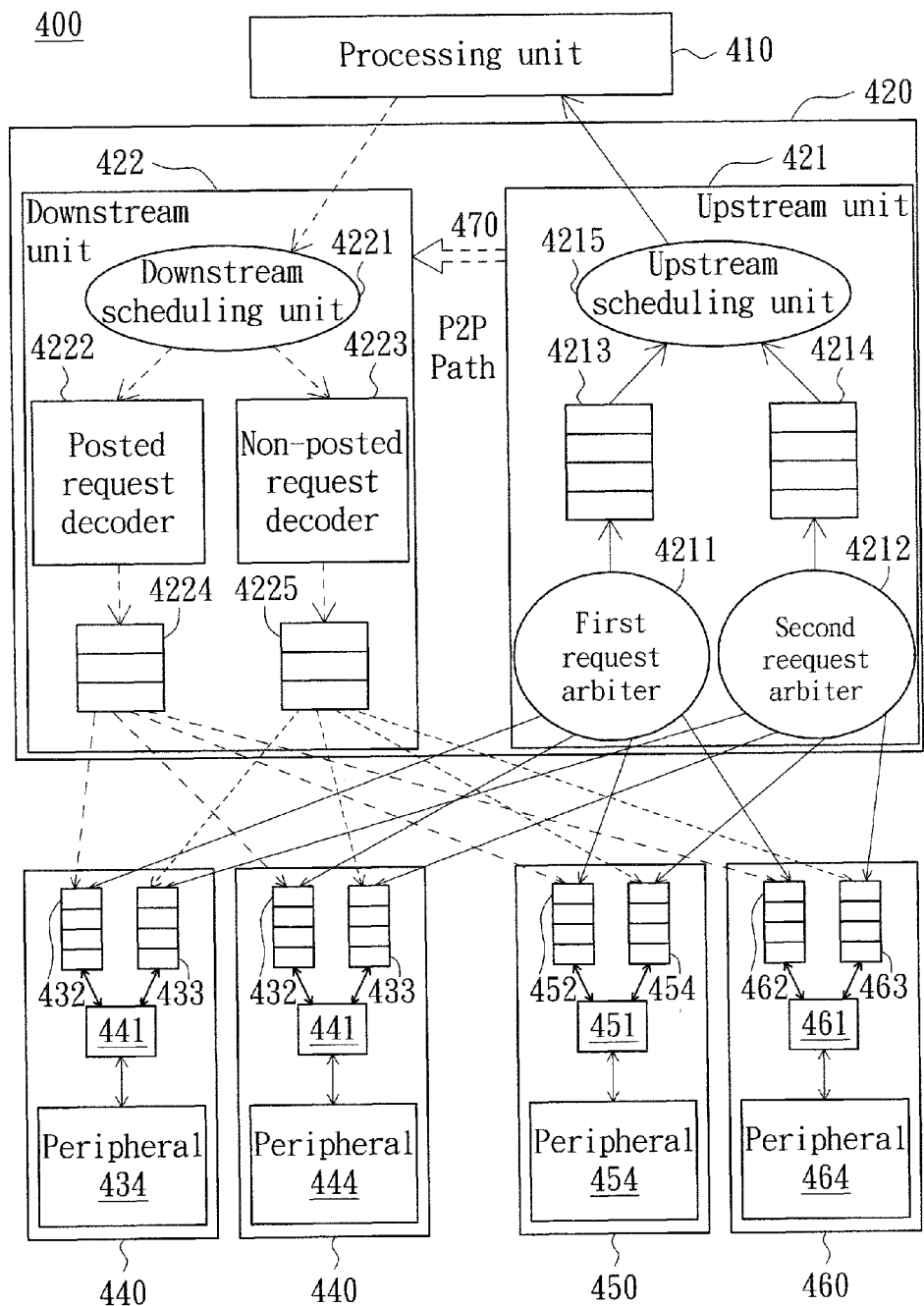
FIG. 2 is a block diagram showing a request accessing system according to another embodiment of the invention.

FIG. 2 is another embodiment showing a block diagram of a request accessing system 400 according to the invention. Various function units shown in FIG. 2 may be equivalent or similar to their counterparts shown in FIG. 1. For example, processing unit 410 and endpoint devices 430~460 may each be equivalent or similar to their counterparts shown in FIG. 1—processing unit 310 and endpoint devices 330~360, respectively. Thus, where various function units of FIG. 2 have an equivalent or similar counterpart in FIG. 1, the explanation of the counterparts above may also be applied to those units shown in FIG. 2.

In the embodiment shown in FIG. 2, the upstream unit 421 includes a first request arbiter 4211, a second request arbiter 4212, a posted request buffer 4213, a non-posted request buffer 4214 and an upstream scheduling unit 4215. The downstream unit 422 includes a downstream scheduling unit 4221, a posted request decoder 4222, a non-posted request decoder 4223, a posted request buffer 4224 and a non-posted request buffer 4225.

The request accessing system 400 will be now more detail discussed below. At first, assume each peripheral 434~464 assert at least one requests, the onboard address decoding units 431~461 respectively decode the request to determine the types of the request. The request could be distinguished into: a peer-to-peer and posted request, a peer-to-peer and non-posted request, a non-peer-to-peer and posted request or a non-peer-to-peer and non-posted request. The request is stored to the posted request buffers 432~462 while the request is a posted request (i.e. a peer-to-peer and posted request and a non-peer-to-peer and posted request); or stored to the non-posted request buffers 433~463 while the request is a non-posted request (i.e. a peer-to-peer and non-posted request and a non-peer-to-peer and non-posted request). Then, the requests stored in the posted request buffers 432~462 and the non-posted request buffers 433~463 are respectively transmitted to the upstream unit 421.

The first request arbiter 4211 receives the requests from the posted request buffers 432~462 and arbitrates the priorities of the requests (i.e. the posted requests) in the posted request buffers 432~462; and then, the requests (i.e. the posted requests) are stored to the posted request buffer 3213 in sequence. The second request arbiter 4212 receives the requests from the non-posted request buffers 433~463 and arbitrates the priorities of the requests (i.e. the non-posted requests) in the non-posted request buffers 433~463; and then, the requests (i.e. the non-posted requests) are stored to the non-posted request buffer 4214 in sequence.

The upstream scheduling unit 4215 receives and schedules the requests from the posted request buffer 4213 and the non-posted request buffer 4214. In the present invention, the upstream scheduling unit 4215 schedules the requests according to the scheduling rules. First, the upstream scheduling unit 4215 transmits the request (i.e. the request comes from either the posted request buffer 4213 or the non-posted request buffer 4214) to the processing unit 410 while the request is a non-peer-to-peer request. The request will be transmitted to the downstream unit 422 after the processing unit 410 processes the request. Second, the upstream scheduling unit 4215 transmits the request (i.e. the request comes from either the posted request buffer 4213 or the non-posted request buffer 4214) to the downstream unit 422 through a peer-to-peer path 470 while the request is a peer-to-peer request. Third, if the request is a peer-to-peer and posted request and there is a previous asserted request which is a peer-to-peer and posted request and the latency of the previous request exceeds a predetermined time T, the upstream scheduling unit 4215 increase the priority of the request (i.e. the peer-to-peer and posted request) over the priority of the previous request (i.e. peer-to-peer and non-posted request). In other words, the request (i.e. the peer-to-peer and posted request) is earlier received by the downstream unit 422 than the previous request (i.e. the peer-to-peer and non-posted request). In the present invention, the peer-to-peer path 470 could be split into two peer-to-peer paths (FIG. 2). Therefore, for example, the upstream scheduling unit 4215 could transmit the previous request (i.e. the peer-to-peer and non-posted request) to the downstream unit 422 through one peer-to-peer path and transmits the request (i.e. the peer-to-peer and posted request) to the downstream unit 422 through the other peer-to-peer path.

For example, while one peer-to-peer and posted request REQ1 is ready to be transmitted to the downstream unit 422, if there is another request REQ0 which is a peer-to-peer and non-posted request and is asserted earlier than the request REQ1, and the latency of the previous request REQ0 exceeds a predetermine time T; thus, the priority of the posted request REQ1 is increased to over the priority of the previous non-posted request REQ0.

The downstream scheduling unit 4221 receives and transmits the requests from the processing unit 410 and the upstream unit 421 to the posted request decoder 4222 and the non-posted request decoder 4223. The posted request decoder 4222 decodes the posted requests and then the decoded posted requests are stored to the posted request buffer 4224. The non-posted request decoder 4223 decodes the non-posted requests and then the decoded non-posted requests are stored to the non-posted request buffer 4225. Finally, the requests in the posted request buffer 4224 and the non-posted request buffer 4225 are respectively transmitted to the objective endpoint devices 430~460.

Figure 3:
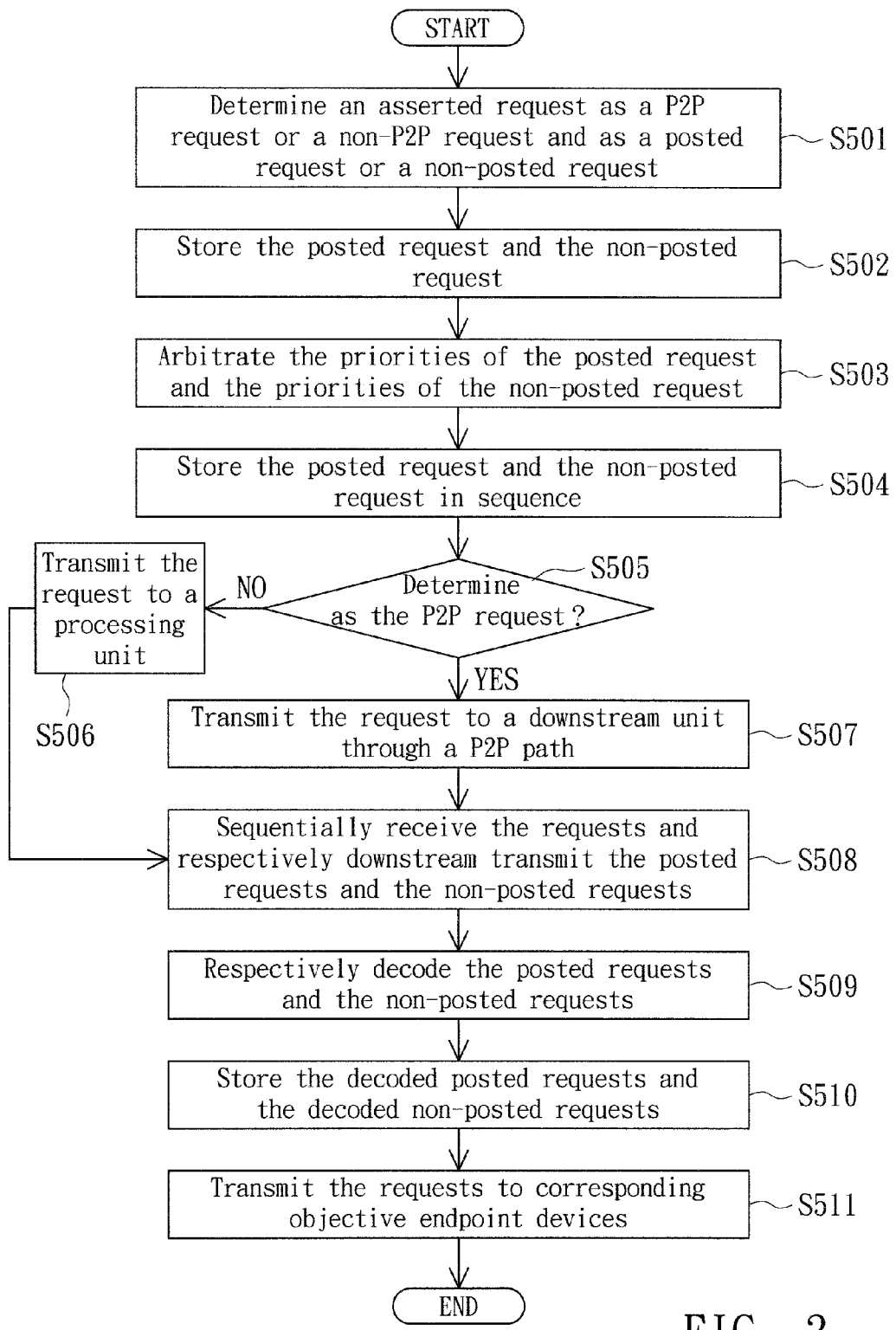
FIG. 3 is a flow chart showing a request accessing method according to the invention.

FIG. 3 is a flow chart showing a request accessing method according to the invention. For simplifying the descriptions, the peer-to-peer request is abbreviated to "P2P", the non-peer-to-peer request is abbreviated to "NONP2P", the posted request is abbreviated to "P" and the non-posted request is abbreviated to "NP". For instance, an abbreviation "REQ_P2P_P" means the request REQ is a peer-to-peer and posted request. Other abbreviations are similar and will not be detail discussion.

The request accessing method in the present is further described in the following in reference to FIG. 2 and FIG. 3. First, while a request REQ (i.e. the request could be REQ_P2P_P, REQ_NONP2P_P, REQ_P2P_NP or, REQ_NONP2_NP) is asserted, the onboard address decoding units 431~461 determine whether the request REQ is a P2P request (i.e. REQ_P2P) or a non-P2P request (i.e. REQ_NONP2P). The onboard address decoding units 431~461 also determine whether the request REQ is a posted request (i.e. REQ_P2P_P and REQ_NONP2P_P) or a non-posted request (i.e. REQ_P2P_NP and REQ_NONP2P_NP) (step S501). Next, the posted request (i.e. REQ_P2P_P and REQ_NONP2P_P) is stored to the posted request buffers 432~462, and the non-posted request (i.e. REQ_P2P_NP and REQ_NONP2P_NP) is stored to the non-posted request buffers 433~463 (step S502). The first request arbiter 4211 and the second request arbiter 4212 respectively arbitrate the priorities of the posted request (i.e. REQ_P2P_P and REQ_NONP2P_P) and the priorities of the non-posted request (i.e. REQ_P2P_NP and REQ_NONP2P_NP) (step S503). Then the posted request (i.e. REQ_P2P_P and REQ_NONP2P_P) and the non-posted request (i.e. REQ_P2P_NP and REQ_NONP2P_NP) are respectively stored to the posted buffer 4213 and the non-posted buffer 4214 in sequence (step S504). Next, the upstream scheduling unit 4215 determines whether the request is a peer-to-peer quest (step S505). If the request REQ is a non-peer-to-peer request (i.e. REQ_NONP2P_N and REQ_NONP2P_NP), the request REQ is transmitted to the processing unit 410 (step S506). If the request REQ is a peer-to-peer request (i.e. REQ_P2P_P and REQ_P2P_NP), the request REQ is transmitted to the downstream unit 422 through the peer-to-peer path 470 (step S507). The downstream scheduling unit 4221 receives the requests from the processing unit 410 and the upstream unit 421 and transmits the posted requests (i.e. REQ_P2P_P and REQ_NONP2P_P) to the posted request decoder 4222, and the non-posted requests (i.e. REQ_P2P_NP and REQ_NONP2P_NP) to the non-posted request decoder 4223 (step S508). The posted request decoder 4222 and the non-posted request decoder 4223 respectively decode the posted requests (i.e. REQ_P2P_P and REQ_NONP2P_P) and the non-posted requests (i.e. REQ_P2P_NP and REQ_NONP2P_NP) (step 509), and store the decoded posted requests (i.e. REQ_P2P_P and REQ_NONP2P_P) and the decoded non-posted requests (i.e. REQ_P2P_NP and REQ_NONP2P_NP) to the posted request buffer 4224 and the non-posted request buffer 4225 (step S510). Finally, the requests are transmitted to corresponding objective endpoint devices 430~440 (step S511).

Figure 4:
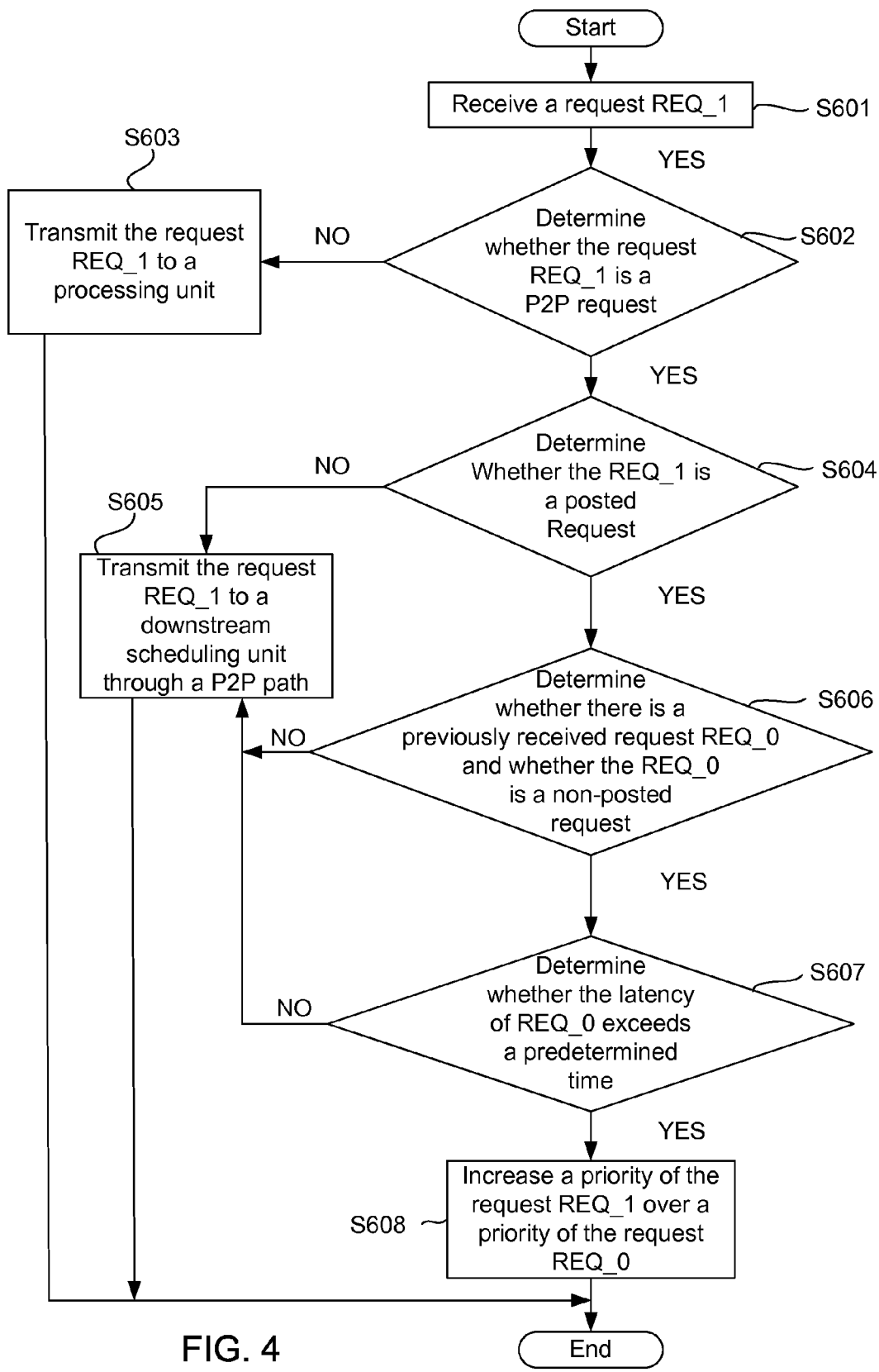
FIG. 4 is a flow chart showing a request scheduling method according to the invention.

In the present invention, the steps S506 and S507 show one example of a request scheduling method according to the present invention. FIG. 4 is a flow chart showing another embodiment of a request scheduling method according to the present invention. First, the upstream scheduling unit 4215 receives a request REQ_1 from either the posted request buffer 4213 or the non-posted request buffer 4214 (step S601). Next, the upstream scheduling unit 4215 determines whether the request REQ_1 is a peer-to-peer request (step S602). If the request REQ_1 is a non-peer-to-peer request, the request REQ_1 is transmitted to the processing unit 410 (step S603). If the request REQ_1 is the peer-to-peer request, the upstream scheduling unit 4215 further determines whether the REQ_1 is a posted request (step S604). If not, the request REQ_1 is transmitted to the downstream scheduling unit 4221 through the peer-to-peer path 470 (step S605). If yes, the upstream scheduling unit 4215 determines whether there is a previously received request REQ_0 and whether the REQ_0 is a non-posted request (step S606). If the request REQ_0 is a posted request, the request REQ_1 is transmitted to the downstream scheduling unit 4221 through the peer-to-peer path 470 (back to step S605). If the request REQ_0 is a non-posted request, the upstream scheduling unit 4215 further determines whether the latency of REQ_0 exceeds a predetermined time T (S607). If no, the request REQ_1 is transmitted to the downstream scheduling unit 4221 through the peer-to-peer path 470 (back to step S605). If yes, the upstream scheduling unit 4215 increases the priority of the request REQ_1 over the priority of the previous request REQ_0 (step S608).

For example, if the endpoint device 430 asserts a peer-to-peer and non-posted request REQ_P2P_NP to read data on the endpoint device 440. Then, the endpoint device 440 also asserts a peer-and-peer and posted request REQ_P2P_P for writing data to the endpoint device 450. In normal condition, since the request REQ_P2P_NP is asserted earlier than the request REQ_P2P_P, the priority of the request REQ_P2P_NP is higher than the request REQ_P2P_P. However, in the present, the upstream scheduling unit 4215 will determines whether the latency of the request REQ_P2P_NP exceeds the predetermined time T. If the latency of the request REQ_P2P_NP exceeds the predetermined time T, the upstream scheduling unit 4215 increases the priority of the request REQ_P2P_P over the priority of the request REQ_P2P_NP. In other words, the request REQ_P2P_P will be transmitted to the downstream unit 422 earlier than the previously asserted request REQ_P2P_NP.

In addition, the peer-to-peer path 470 could be further divided into two spilt peer-to-peer paths including a peer-to-peer posted path for transmitting the peer-to-peer and posted request REQ_P2P_P, and a peer-to-peer non-posted path for transmitting the peer-to-peer and non-posted request REQ_P2P_NP.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A request accessing method for accessing at least one request, the method comprising:
   storing the request to a posted request buffer while the request is a posted-request;
   storing the request to a non-posted request buffer while the request is a non-posted request;
   arbitrating the priorities of the requests in the posted buffer and the non-posted buffer; and
   scheduling the requests according to schedule rules;
   wherein the schedule rules comprise:
      transmitting the request to a processing unit while the request is a non-peer-to-peer request, and
      transmitting the request to a downstream unit while the request is a peer-to-peer request.

2. The method according to claim 1, wherein the schedule rules further comprise:
   increasing the priority of the request over the priority of a previous asserted request wherein if the previous asserted request is a peer-to-peer and non-posted request and has a latency exceeds a predetermined time.

3. The method according to claim 1, further comprising:
   decoding the requests and transmitting the decoded requests to corresponding endpoint devices.

4. The method according to claim 2, further comprising:
   transmitting the previous asserted request, the peer-to-peer and non-posted request, to the request downstream unit through a first peer-to-peer path; and
   transmitting the request, the peer-to-peer and posted request, to the request downstream unit through a second peer-to-peer path.

5. A request scheduling method, comprising:
   receiving a peer-to-peer and posted request;
   determining whether a latency of a previous asserted peer-to-peer and non-posted request exceeds a predetermined time; and
   increasing the priority of the peer-to-peer and posted request over the priority of the previous asserted peer-to-peer and non-posted request if the latency of the previous asserted peer-to-peer and non-posted request exceeds the predetermined time.

6. The method according to claim 5, further comprising:
   transmitting the previous asserted peer-to-peer and non-posted request through a first peer-to-peer path; and transmitting the peer-to-peer and posted request through a second peer-to-peer path.

7. A request scheduling method, the method is applied in a request accessing system having a processing unit, an upstream unit coupled to the processing unit, a downstream unit coupled to the processing unit and the upstream unit, and at least one endpoint device coupled to the upstream unit and the downstream unit, wherein the endpoint device asserts at least one request to the upstream unit, the method comprising:
   transmitting the request to a processing unit while the request is a non-peer-to-peer request, and
   transmitting the request to a downstream unit while the request is a peer-to-peer request;
   wherein if the request is a peer-to-peer and posted request and there is a previous asserted request which is a peer-to-peer and non-posted request and the previous asserted request has a latency exceeds a predetermined time, transmitting the request earlier than the previous asserted request to the downstream unit.

8. The method according to claim 7, further comprising:
   transmitting the peer-to-peer and non-posted request to the downstream unit through a first peer-to-peer-path; and transmitting the peer-to-peer and posted request to the downstream unit through a second peer-to-peer-path.

9. A request accessing system, comprising:
an endpoint device for asserting at least one request, wherein the request is stored to a first posted request buffer while the request is a posted request, or stored to a first non-posted request buffer while the request is a non-posted request;
a root complex, coupled to the endpoint device, for receiving the request; and
a processing unit, coupled to the root complex for processing the request;
wherein the request is selected from a peer-to-peer and posted request, a peer-to-peer and non-posted request, a non-peer-to-peer and posted request and a non-peer-to-peer and non-posted request.

10. The system according to claim 9, wherein the endpoint device comprises:
a peripheral for outputting the request; and
an onboard address decoding unit, coupled to the peripheral, for determining the types of the request.

11. The system according to claim 9, wherein the root complex comprises:
an upstream unit for receiving the requests from the first posted request buffer and the first non-posted request buffer; and
a downstream unit for receiving the requests from the upstream unit and the processing unit, and transmitting the request to an objective endpoint device.

12. The system according to claim 9 wherein the request accessing system is a peripheral components interconnect express system.

13. The system according to claim 11, wherein the upstream unit comprises:
a second posted request buffer;
a first request arbiter, coupled between the first posted request buffer and the second posted request buffer, the first request arbiter receives the requests from the first posted request buffer and arbitrates the priorities of the requests, then stores the requests to the second posted request register in sequence;
a second non-posted request buffer;
a second request arbiter, coupled between the first non-posted request buffer and the second non-posted request buffer, the second request arbiter receives and the requests from the first non-posted request buffer and arbitrates the priorities of the requests, then stores the requests to the second non-posted request buffer; and
an upstream scheduling unit for scheduling requests stored in the second posted request buffer and the second non-posted request buffer.

14. The system according to claim 11, wherein the downstream unit comprises:
a downstream scheduling unit for scheduling the requests from the processing unit and the upstream unit;
a posted request decoder, coupled to the downstream scheduling unit, for decoding the posted request;
a third posted request buffer, coupled to the posted request decoder, for storing the posted request decoded by the posted request decoder, and transmitting the posted request to the objective endpoint device;
a non-posted request decoder, coupled to the downstream scheduling unit, for decoding the non-posted request; and
a third non-posted buffer, coupled to the non-posted request decoder, for storing the non-posted request decoded by the non-posted request decoder, and transmitting the non-posted request to the objective endpoint device.

15. The system according to claim 13, wherein the upstream scheduling unit transmits the request to the processing unit while the request is a non-peer-to-peer request or to the downstream unit through a peer-to-peer path while the request is a peer-to-peer request.

16. The system according to claim 15, wherein if the request is a peer-to-peer and posted request and there is a previous asserted request which is a peer-to-peer and non-posted request having a latency exceeding a predetermined time, the upstream scheduling unit increasing the priority of the request over the priority of the previous asserted request.

17. The system according to claim 16, wherein the upstream scheduling unit transmits the previous peer-to-peer and non-posted request through a first peer-to-peer path and transmits the peer-to-peer and posted request through a second peer-to-peer path.

18. The system according to claim 16, wherein the downstream unit receives the peer-to-peer and posted request earlier than the previous peer-to-peer and non-posted request.

* * * * *